(12) United States Patent  
Lee

(10) Patent No.: US 11,050,998 B2  
(45) Date of Patent: Jun. 29, 2021

(54) SYSTEM OF CAMERA CALIBRATION

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 16/251,100

(22) Filed: Jan. 18, 2019

(65) Prior Publication Data  
US 2019/0222825 A1 Jul. 18, 2019

Related U.S. Application Data

(60) Provisional application No. 62/618,642, filed on Jan. 18, 2018.

(51) Int. Cl.  
H04N 13/246 (2018.01)  
H04N 5/232 (2006.01)  
(Continued)

(52) U.S. Cl.  
CPC ............ H04N 13/246 (2018.05); G06T 7/55 (2017.01); H04N 5/2256 (2013.01); H04N 5/23238 (2013.01); H04N 17/002 (2013.01)

(58) Field of Classification Search  
CPC ...... G06T 7/55; H04N 13/239; H04N 13/243; H04N 13/246; H04N 17/002;  
(Continued)

(56) References Cited

U.S. PATENT DOCUMENTS

2002/0167726 A1 11/2002 Barman  
2009/0279055 A1* 11/2009 Amano ................... G03B 3/00  
353/101  
(Continued)

FOREIGN PATENT DOCUMENTS

CN 104574355 A 4/2015  
CN 105225224 A 1/2016  
(Continued)

OTHER PUBLICATIONS

M. Brown, A. Majumder and R. Yang, "Camera-based calibration techniques for seamless multiprojector displays," https://ieeexplore.ieee.org/stamp/stamp.jsp?tp=&arnumber=1388230. IEEE Transactions on Visualization and Computer Graphics, vol. 11, No. 2, pp. 193-206, Mar.-Apr. 2005. (Year: 2005).*

Primary Examiner — Farzana Hossain  
(74) Attorney, Agent, or Firm — Winston Hsu

(57) ABSTRACT

A system of camera calibration includes at least one first equipment and at least one second equipment, wherein a camera of at least one camera includes at least two image capturing groups, each image capturing group of the at least two image capturing groups includes at least two image capturers. Each first equipment provides at least one first calibration pattern, and the at least one first calibration pattern is utilized to calibrate first images including the at least one first calibration pattern captured by a plurality of corresponding image capturers of the at least two image capturing groups. Each second equipment provides at least one second calibration pattern, and the at least one second calibration pattern is utilized to calibrate second images including the at least one second calibration pattern captured by two corresponding adjacent image capturers of the at least two image capturing groups.

17 Claims, 16 Drawing Sheets

(51) Int. Cl.
*G06T 7/55* (2017.01)
*H04N 5/225* (2006.01)
*H04N 17/00* (2006.01)

(58) Field of Classification Search
CPC ......... H04N 2013/0081; H04N 5/2256; H04N 5/2258; H04N 5/23238
See application file for complete search history.

(56) References Cited

U.S. PATENT DOCUMENTS

| | | | |
|---|---|---|---|
| 2010/0197354 A1* | 8/2010 | Lee | H04M 1/0272 455/566 |
| 2012/0300044 A1* | 11/2012 | Thomas | H04N 9/3194 348/51 |
| 2014/0168367 A1* | 6/2014 | Kang | G06T 7/85 348/46 |
| 2015/0103143 A1* | 4/2015 | Hsueh | G06T 7/85 348/46 |
| 2016/0088287 A1* | 3/2016 | Sadi | G03B 35/08 348/43 |
| 2016/0182903 A1 | 6/2016 | Grundhöfer | |
| 2017/0221210 A1* | 8/2017 | Martinello | H04N 13/282 |
| 2018/0124371 A1* | 5/2018 | Kamal | G01B 11/00 |
| 2019/0104288 A1* | 4/2019 | Hsu | H04N 9/3147 |

FOREIGN PATENT DOCUMENTS

| | | |
|---|---|---|
| CN | 106605407 A | 4/2017 |
| CN | 206400640 U | 8/2017 |
| CN | 107121110 A | 9/2017 |
| CN | 206672175 U | 11/2017 |
| JP | 11-118425 A | 4/1999 |

\* cited by examiner

SYSTEM OF CAMERA CALIBRATION

CROSS REFERENCE TO RELATED APPLICATIONS

This application claims the benefit of U.S. Provisional Application No. 62/618,642, filed on Jan. 18, 2018 and entitled "CAMERA CALIBRATION METHOD AND LIGHT CONTROL SYSTEM", the contents of which are incorporated herein by reference.

BACKGROUND OF THE INVENTION

1. Field of the Invention

The present invention relates to a system of camera calibration, and particularly to a system of camera calibration that can reduce time and space requirements.

2. Description of the Prior Art

In the prior art, when a system of camera calibration calibrates a camera, the system would place the camera among a plurality of calibration devices included in the system. Since each calibration device of the plurality of calibration devices is installed on a corresponding fixed position, when calibrating the camera (for example, the system calibrates deformation (lens distortion and alignment of image pair) of images captured by the camera and applies a disparity-to-distance calibration or a distance-to-distance calibration to depth information of depth maps generated by the images captured by the camera), the system would cost more time and space. Therefore, how to reduce time and space requirements of the system is an important issue for a system designer.

SUMMARY OF THE INVENTION

An embodiment of the present invention provides a system of camera calibration. The system includes at least one first equipment and at least one second equipment, wherein a camera of at least one camera includes at least two image capturing groups, each image capturing group of the at least two image capturing groups includes at least two image capturers. Each first equipment provides at least one first calibration pattern, and the at least one first calibration pattern is utilized to calibrate first images including the at least one first calibration pattern, wherein the first images are captured by a plurality of corresponding image capturers of the at least two image capturing groups. Each second equipment provides at least one second calibration pattern, and the at least one second calibration pattern is utilized to calibrate second images including the at least one second calibration pattern, wherein the second images are captured by two corresponding adjacent image capturers of the at least two image capturing groups.

Another embodiment of the present invention provides a system of camera calibration. The system includes at least one first equipment, wherein a camera of at least one camera comprises at least one image capturing groups, each image capturing group of the at least one image capturing groups comprises at least two image capturers. Each first equipment provides at least one first calibration pattern, the each first equipment is moved along at least one slide rail and is rotated via at least one rotating shaft, and the at least one first calibration pattern is utilized to calibrate first images comprising the at least one first calibration pattern.

The present invention provides a system of camera calibration. The system utilizes each first equipment included in the system to provide at least one first calibration pattern and utilizes each second equipment included in the system to provide at least one second calibration pattern, wherein the at least one first calibration pattern is utilized to calibrate first images including the at least one first calibration pattern, the first images are captured by a plurality of corresponding image capturers of the camera, the at least one second calibration pattern is utilized to calibrate second images including the at least one second calibration pattern, and the second images are captured by two corresponding adjacent image capturers of the camera. Therefore, compared to the prior art, the present invention can reduce time and space requirements of the system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
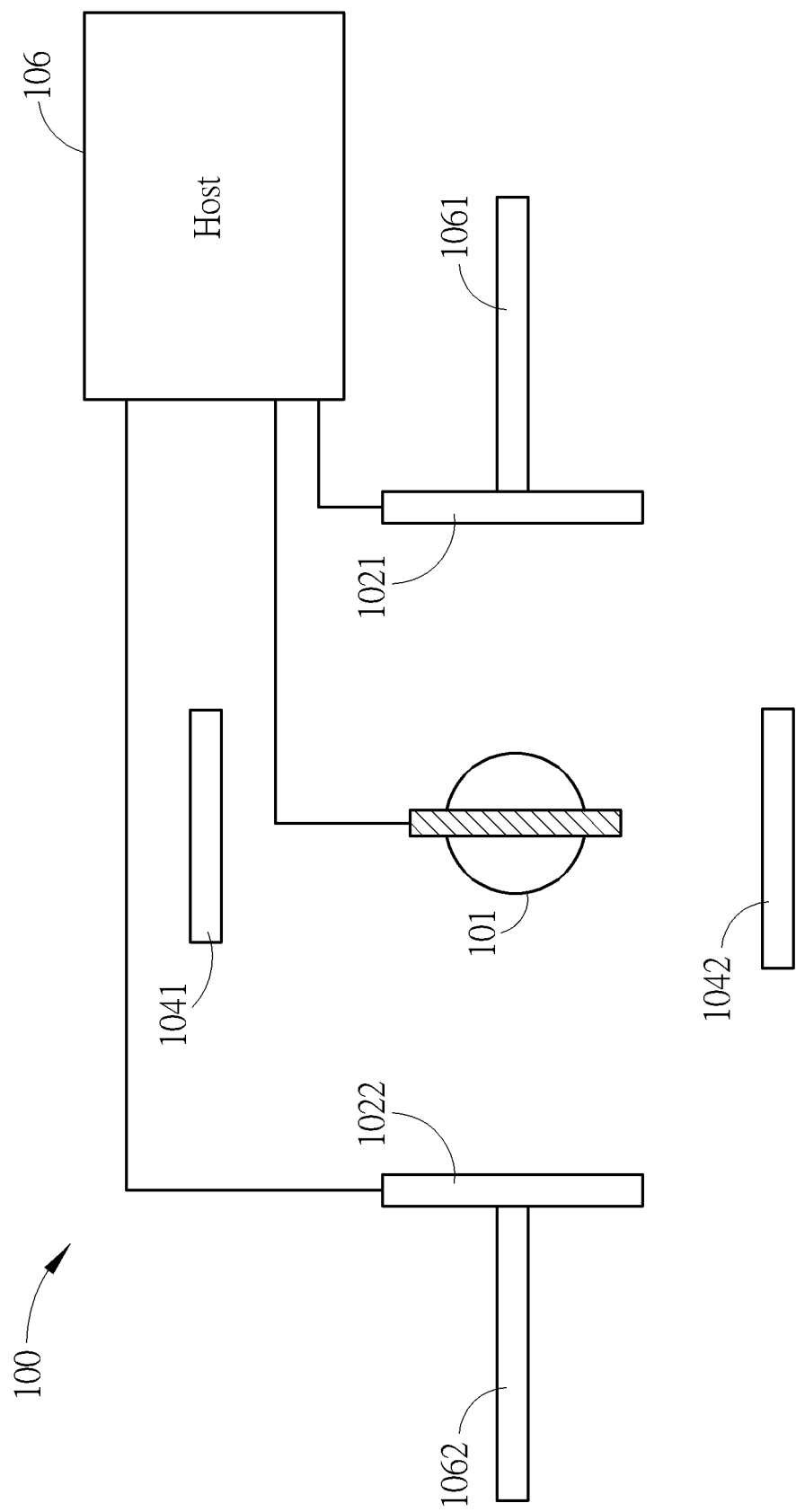
FIG. 1 is a diagram illustrating a system of calibrating camera according to a first embodiment of the present invention.

Please refer to FIG. 1. FIG. 1 is a diagram illustrating a system 100 of camera calibration according to a first embodiment of the present invention. As shown in FIG. 1, the system 100 includes two first equipment 1021, 1022, two second equipment 1041, 1042 and a host 106, wherein the host 106 is coupled to the first equipment 1021, 1022 and the camera 101. But in another embodiment of the present invention, the host 106 can be coupled to the two second equipment 1041, 1042. Moreover, the present invention is not limited to the system 100 including the two first equipment 1021, 1022 and the two second equipment 1041, 1042, that is, the present invention can include at least one first equipment and least one second equipment. The present invention is also not limited to positions of the two first equipment 1021, 1022 in FIG. 1. Moreover, as shown in FIG. 1, the system 100 further includes first slide rails 1061, 1062.

Figure 2A:
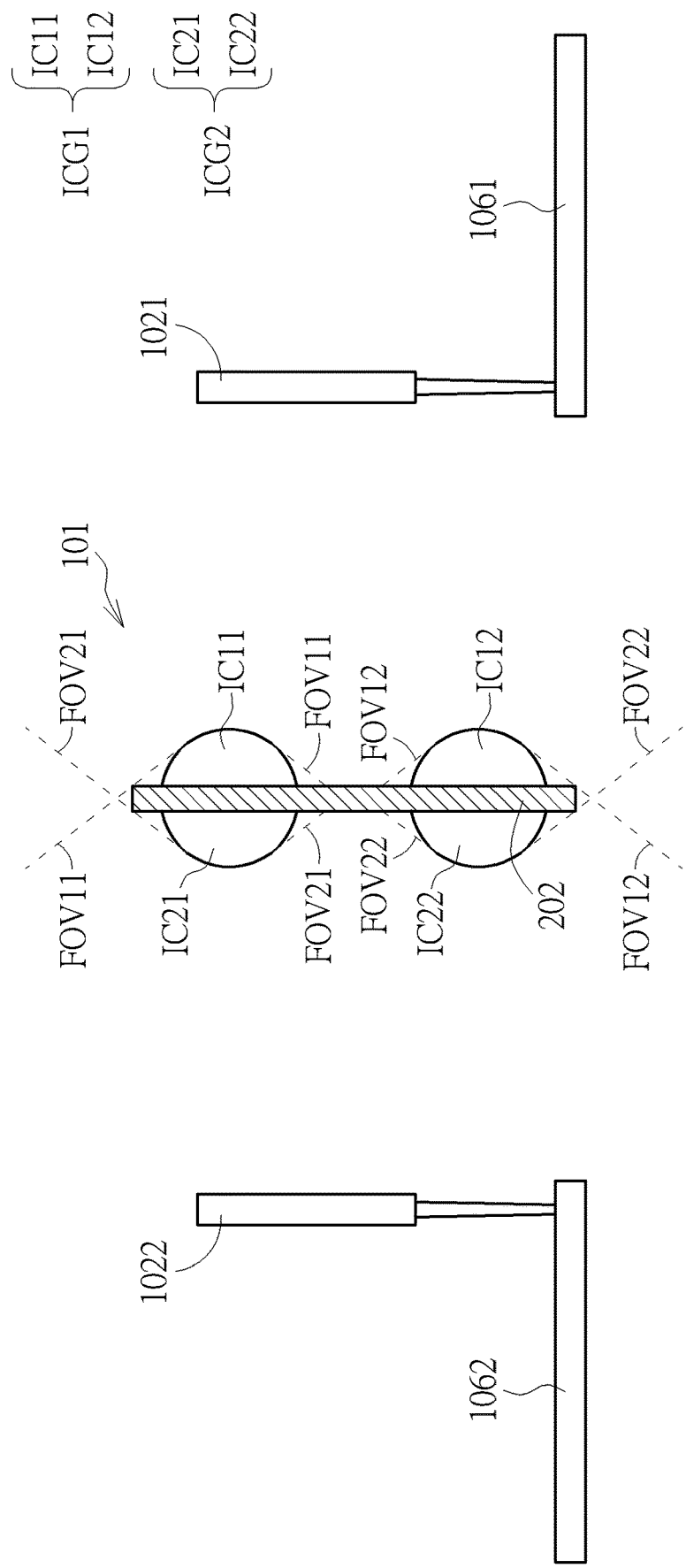
FIG. 2A is a diagram illustrating the positions of the first equipment corresponding to the image capturing groups of the camera.
Figure 2B:
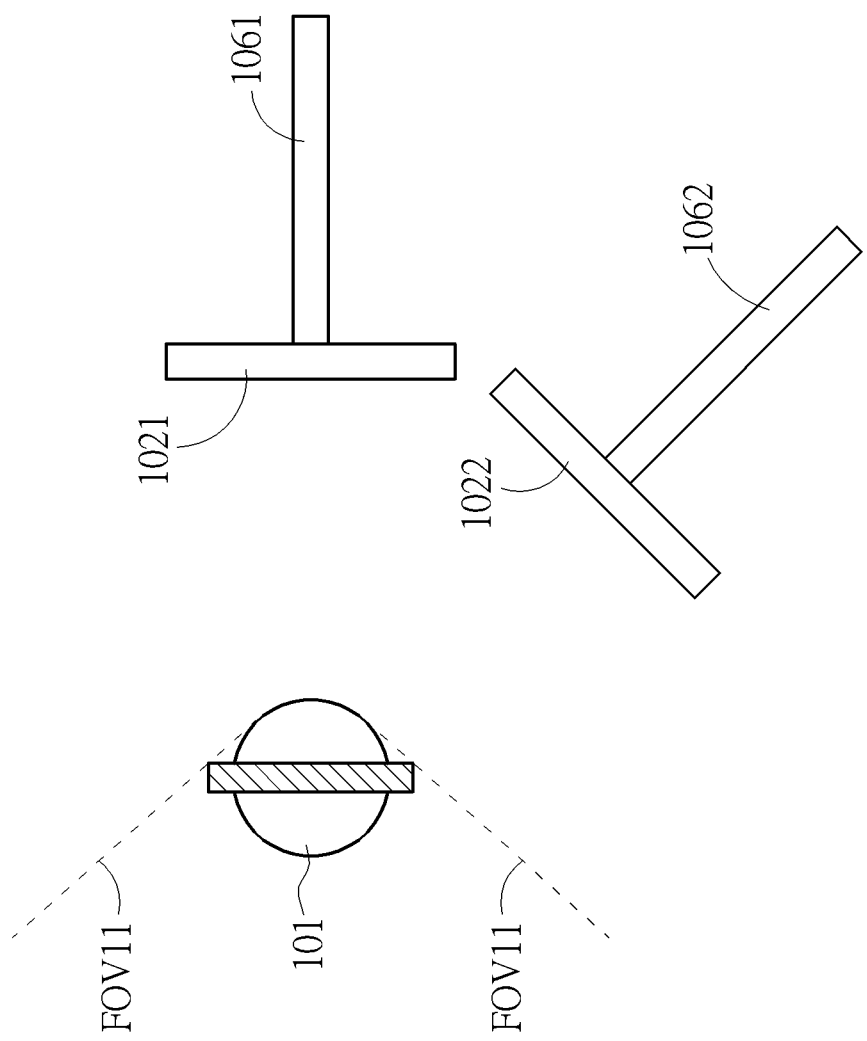
FIG. 2B is a diagram illustrating a top view of the positions of the first equipment corresponding to the image capturing groups according to another embodiment of the present invention.

In addition, as shown in FIG. 2A (wherein FIG. 2A does not show the second equipment 1041, 1042 for simplicity), the camera 101 includes two image capturing groups ICG1, ICG2, wherein the image capturing group ICG1 includes two image capturers IC11, IC12, the image capturing group ICG2 includes two image capturers IC21, IC22, the image capturers IC11, IC12, IC21, IC22 are fisheye image capturers, and the image capturing groups ICG1, ICG2 are installed on a supporting unit 202. In addition, the camera 101 can also include at least two image capturing groups. Since the image capturers IC11, IC12, IC21, IC22 are the fisheye image capturers, a sum of view angles of the image capturers IC11, IC21 is not less than 360 degree, and a sum of view angles of the image capturers IC12, IC22 is not less than 360 degree. Thus, images captured by the image capturing groups ICG1, ICG2 can be utilized to generate two 360 panoramic image (for example, images captured by the image capturers IC11, IC21 can be utilized to generate a first 360 panoramic image, and the images captured by the image capturers IC12, IC22 can be utilized to generate a second 360 panoramic image), and the two 360 panoramic images can be utilized to generate a 360 panoramic depth map. For example, the images captured by the image capturers IC11, IC21 can be utilized to generate a first 360 panoramic image of the two 360 panoramic images, and the 360 panoramic image of the two 360 panoramic images can be utilized to generate the 360 panoramic depth map. But the present invention is not limited to the image capturers IC11, IC12, IC21, IC22 are the fisheye image capturers, that is, the image capturers IC11, IC12, IC21, IC22 can be non-fisheye image capturers. Thus, the present invention is also not limited to the sum of view angles of the image capturers IC11, IC21 and the sum of view angles of the image capturers IC12, IC22 being not less than 360 degree. In the system 100, each first equipment of the first equipment 1021, 1022 is installed inside view angles of a plurality of corresponding image capturers of the two image capturing groups ICG1, ICG2. As shown in FIG. 2A, the image capturer IC11 has a view angle FOV11, the image capturer IC12 has a view angle FOV12, the image capturer IC21 has a view angle FOV21, the image capturer IC22 has a view angle FOV22. The first equipment 1021 is installed inside the view angle FOV11 and the view angle FOV12, the first equipment 1022 is installed inside the view angle FOV21 and the view angle FOV22. Moreover, in another embodiment of the present invention, the first equipment 1021 is not opposite to the first equipment 1022 (as shown in FIG. 2B), that is, the first equipment 1021, 1022 are installed inside the view angle FOV11 and the view angle FOV12. Thus, the first equipment 1021, 1022 can be utilized to calibrate a part of the 360 panoramic depth map. Moreover, the present invention is not limited to the first equipment 1021, 1022 being at positions shown in FIG. 2B.

Figure 2C:
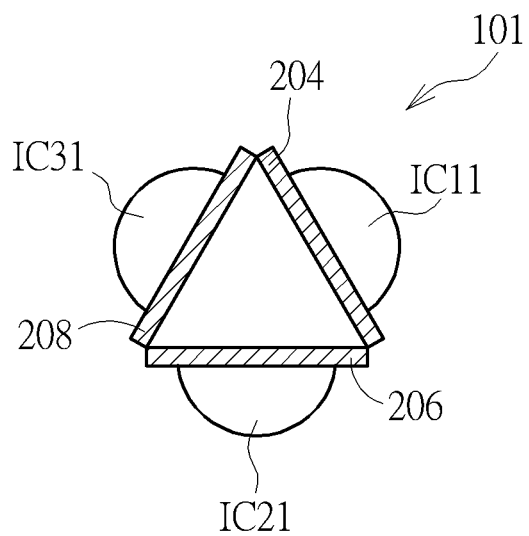
FIG. 2C is a diagram illustrating a top view of the camera according to another embodiment of the present invention.

In addition, it is obvious to those of ordinary skill in the art that each image capturer of the image capturers IC11, IC12, IC21, IC22 at least includes a lens and an image sensor (e.g. a charge-coupled device (CCD) image sensor, or a complementary metal-oxide-semiconductor (CMOS) image sensor). In addition, FIG. 2C is a diagram illustrating a top view of the camera 101 according to another embodiment of the present invention. As shown in FIG. 2C, a camera 101 can include three supporting units 204, 206, 208 and three image capturing groups ICG1, ICG2, ICG3, wherein the each image capturing group of the image capturing groups ICG1, ICG2, ICG3 can include two image capturers, a top view of supporting units 204, 206, 208 forms a triangle, and the two image capturers are the fisheye image capturers or the non-fisheye image capturers. FIG. 2C only shows image capturers IC11-IC31 and the supporting units 204, 206, 208 for simplicity.

Figure 3:
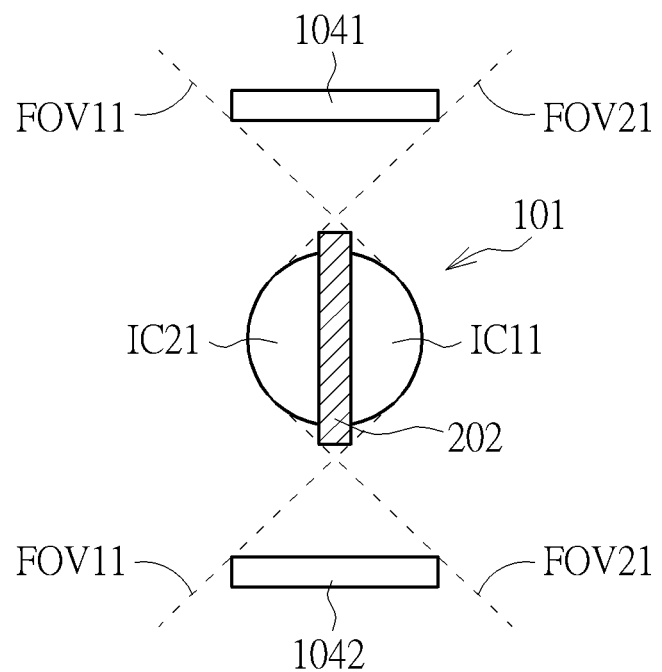
FIG. 3 is a diagram illustrating a top view corresponding to FIG. 2A

Please refer to FIG. 3, FIG. 3 is a diagram illustrating a top view corresponding to FIG. 2A, wherein FIG. 3 does not show the first equipment 1021, 1022 and the image capturers IC12, IC22 for simplicity. As shown in FIG. 3, each second equipment of the second equipment 1041, 1042 is installed inside view angles of two corresponding adjacent image capturers of the two image capturing groups ICG1, ICG2. For example, as shown in FIG. 3, the second equipment 1041 is installed inside the view angle FOV11 and the view angle FOV21, and the second equipment 1042 is also installed inside the view angle FOV11 and the view angle FOV21. In addition, although FIG. 3 does not show the image capturers IC12, IC22, those of ordinary skill in the art should know that the second equipment 1041 and the second equipment 1042 are also located inside the view angle FOV12 and the view angle FOV22.

Figure 4:
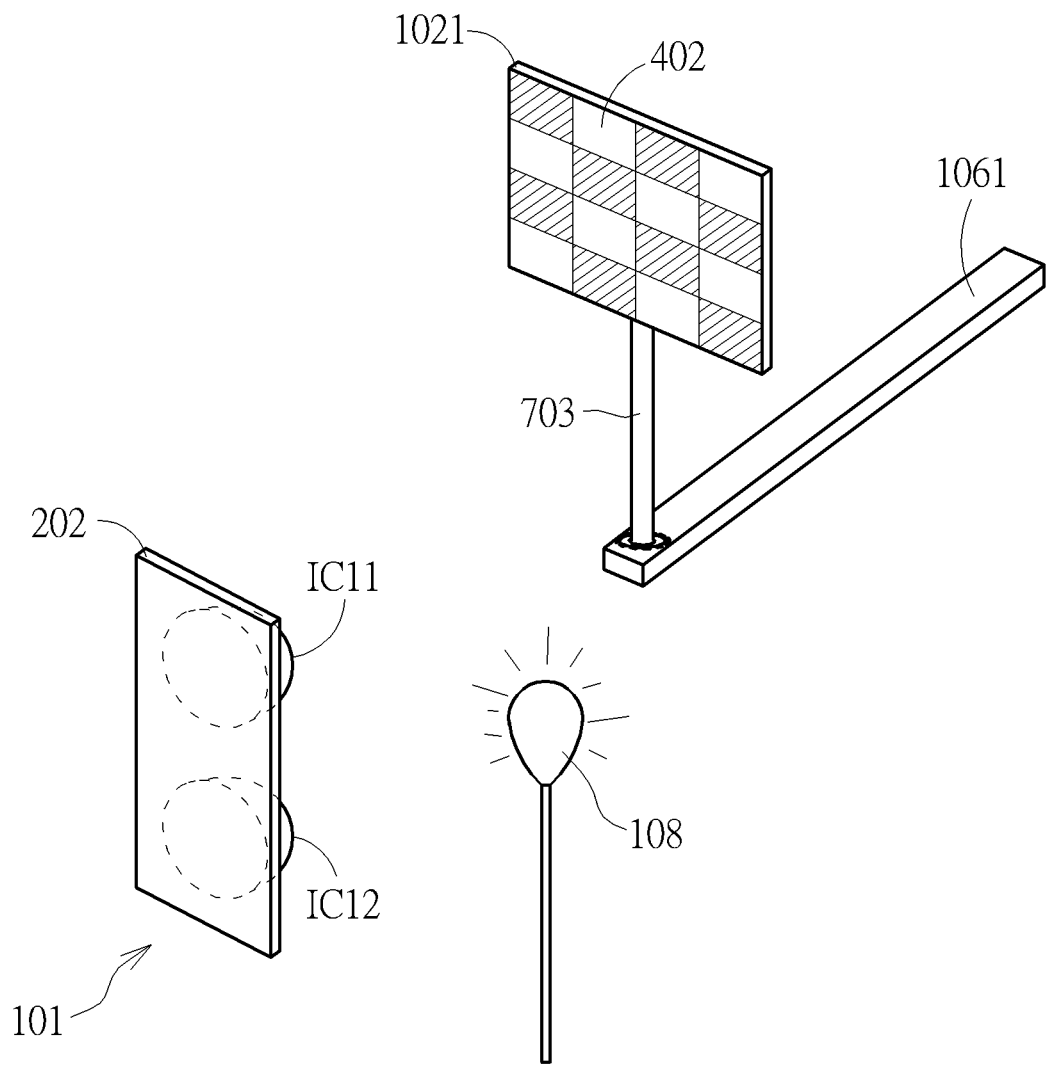
FIG. 4 is a diagram illustrating the camera, the first equipment, the light source and the first slide rail.
Figure 5:
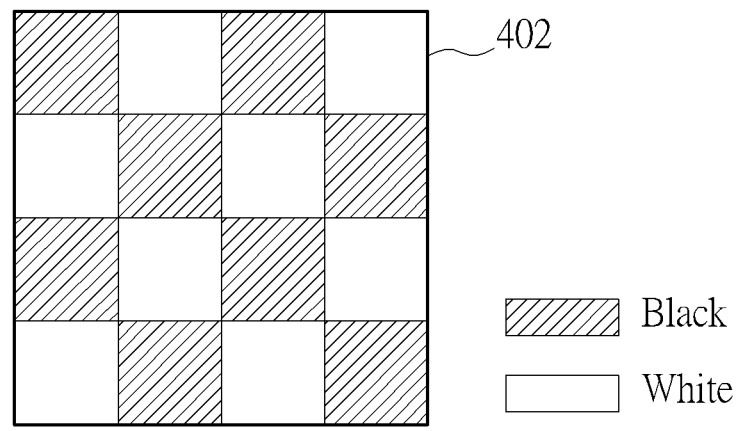
FIG. 5 is a diagram illustrating the first calibration pattern.

Please refer to FIG. 4, FIG. 4 is a diagram illustrating the camera 101, the first equipment 1021, a light source 108, the first slide rail 1061, and a first rotating shaft 703, wherein the camera 101 of FIG. 4 only shows the image capturers IC11, IC12 for simplicity. As shown in FIG. 4, the first equipment 1021 is installed on the first slide rail 1061, therefore the first equipment 1021 can be moved along the first slide rail 1061. In addition, as shown in FIG. 4, the system 100 further includes the light source 108, the first equipment 1021 can provide a first calibration pattern 402 (as shown in FIG. 5), and the first calibration pattern 402 is a chessboard pattern. But the present invention is not limited to the first calibration pattern 402 being the chessboard pattern, that is, the first calibration pattern 402 can be a pattern with a plurality of feature points. In addition, in one embodiment of the present invention, the first calibration pattern 402 can be implemented by paper, glass, wood, light, or projected image. But in another embodiment of the present invention, the first equipment 1021 is a display for displaying the first calibration pattern 402. As shown in FIG. 5, the first calibration pattern 402 includes 16 geometric blocks, each geometric block of the 16 geometric blocks is a quadrangle, and colors of the 16 geometric blocks are black alternating with white. But in another embodiment of the present invention, the first calibration pattern 402 can include a plurality of geometric blocks, and each geometric block of the plurality of geometric blocks can be another shape. In addition, in another embodiment of the present invention, a color of the each geometric block of the 16 geometric blocks is a uniform color (e. g. red color, green color, orange color, and so on), or a gradient color. Moreover, the light source 108 is an infrared light source for generating structured light. But, the present invention is not limited to the light source 108 being the infrared light source, that is, the light source 108 can be other type of light sources (e.g. the light source 108 can be a visible light source) or a projector. Moreover, the light source 108 can be an external independent light source or an internal component of the camera 101, and the present invention is not limited to the system 100 only including the light source 108, that is, in another embodiment of the present invention, the system 100 can include a plurality of light source, and the plurality of light source are used for generating a plurality of same or different structured light.

As shown in FIG. 4, when the light source 108 is turned off, the first equipment 1021 can be moved along the first slide rail 1061 or not, and the first equipment 1021 can be rotated via the first rotating shaft 703, wherein the first rotating shaft 703 is rotated by a gear. When the first equipment 1021 is rotated via the first rotating shaft 703, the image capturers IC11, IC12 can capture first images including space information of a plurality of angles corresponding to the first calibration pattern 402. After the image capturers IC11, IC21 capture first images including space information of a plurality of angles, the host 106 can receive the first images including the space information of the plurality of angles and calibrate deformation (for example, lens distortion and alignment of image pair) of the first images including the space information of the plurality of angles according to the first calibration pattern 402 and the space information of the plurality of angles. When the light source 108 is turned on, the first equipment 1021 can be moved along the first slide rail 1061 to make the first equipment 1021 display the first calibration pattern 402 on different positions of the first slide rail 1061. Meanwhile the image capturers IC11, IC12 can capture the first images including the first calibration pattern 402 and the structured light, wherein the first images correspond to the different positions of the first slide rail 1061. Then, the host 106 can receive the first images corresponding to the different positions, generate depth maps corresponding to the different positions according to the first images corresponding to the different positions, or calibrate depth information (that is, a disparity-to-distance calibration or a distance-to-distance calibration) corresponding to the different positions according to a plurality of feature points of the first calibration pattern 402. In addition, operational principles of the first equipment 1022 and the slide rails 1062 are the same as those of the first equipment 1021 and those of the slide rails 1061, so further description thereof is omitted for simplicity. Moreover, in another embodiment of the present invention, each first equipment of at least one first equipment of the system 100 includes a plurality of sub equipment, wherein each sub equipment can be moved along a corresponding slide rail, that is, operational principles of the each sub equipment are the same as those of the first equipment 1021 in FIG. 4, so further description thereof is omitted for simplicity.

Figure 6:
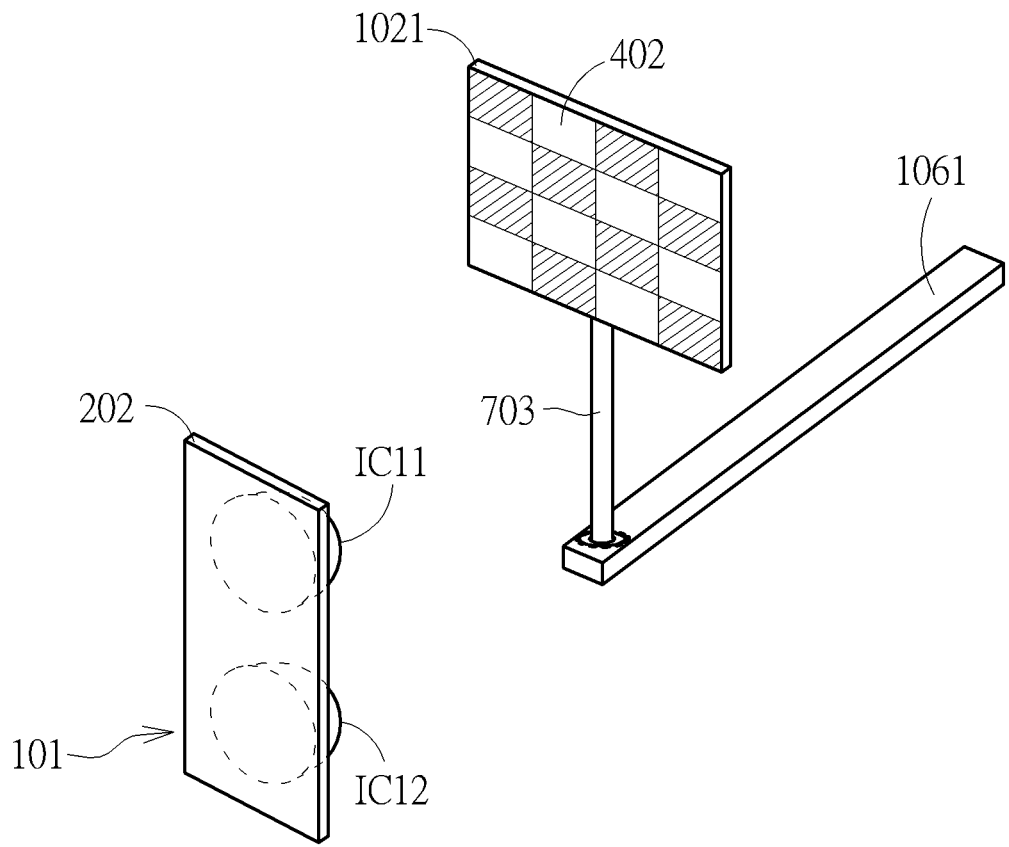
FIG. 6 is a diagram illustrating the system that does not include the light source.

In addition, in another embodiment of the present invention, the system 100 does not include the light source 108 (as shown in FIG. 6), wherein FIG. 6 only shows the camera 101, the first equipment 1021, the first slide rail 1061, and the first rotating shaft 703. As shown in FIG. 6, the first equipment 1021 can be rotated via the first rotating shaft 703 to make the image capturers IC11, IC12 capture the first images including the space information of the plurality of angles corresponding to the first calibration pattern 402. After the image capturers IC11, IC12 capture the first images including the space information of the plurality of angles, the host 106 can receive the first images including the space information of the plurality of angles, calibrate deformation of the first images including the space information of the plurality of angles according to the first calibration pattern 402 and the space information of the plurality of angles to generate deformation calibrating parameters, and transmit the deformation calibrating parameters to the image capturers IC11, IC12. After the image capturers IC11, IC12 receive the deformation calibrating parameters, the first equipment 1021 can be moved along the first slide rail 1061 to make the first equipment 1021 display the first calibration pattern 402 on different positions of the first slide rail 1061, and the image capturers IC11, IC21 can capture the first images including the first calibration pattern 402 and corresponding to the different positions of the first slide rail 1061 according to the deformation calibrating parameters, wherein the first images corresponding to the different positions do not include deformation because of the deformation calibrating parameters. Then, the host 106 can receive the first images corresponding to the different positions, generate depth maps corresponding to the different positions according to the first images corresponding to the different positions, or calibrate the depth information (that is, the disparity-to-distance calibration or the distance-to-distance calibration) corresponding to the different positions according to a plurality of feature points of the first images.

Figure 7:
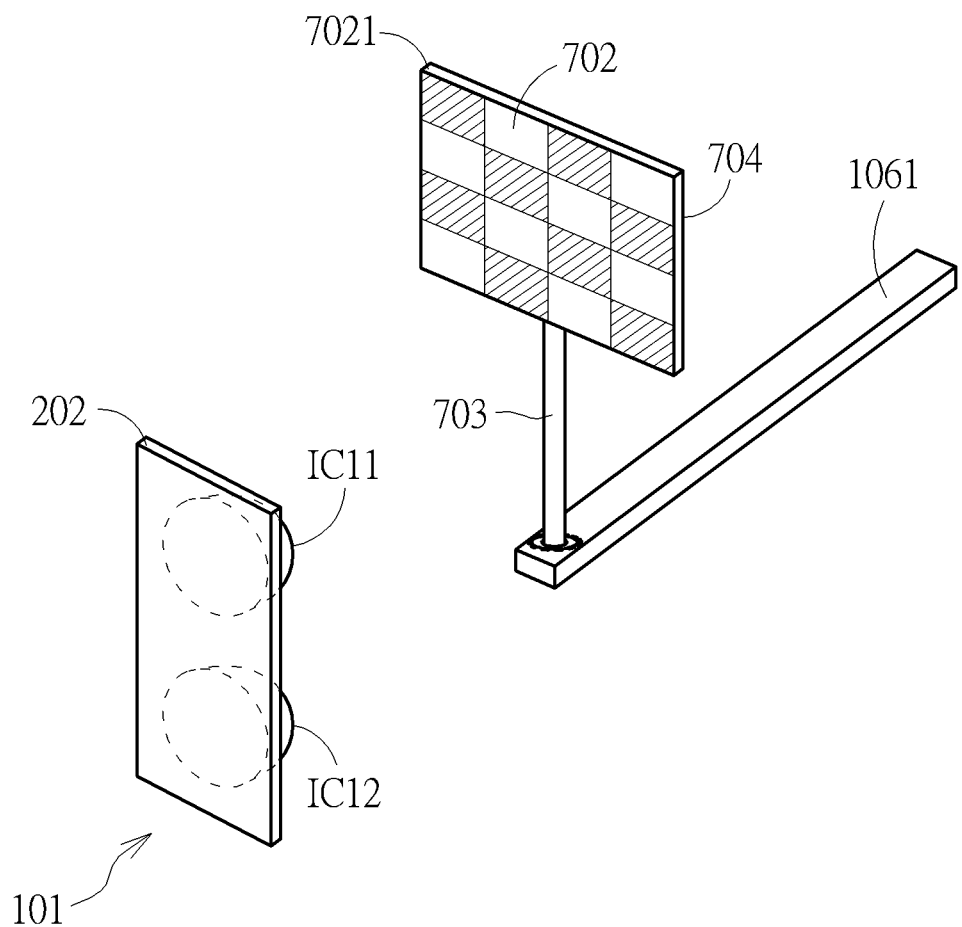
FIG. 7 is a diagram illustrating a first equipment according to another embodiment of the present invention.
Figure 8:
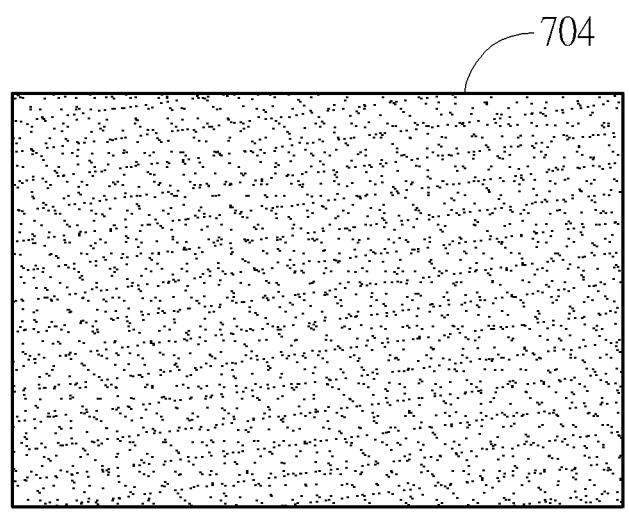
FIG. 8 is a diagram illustrating other first calibration pattern according to another embodiment of the present invention.

In addition, please refer to FIG. 7. FIG. 7 is a diagram illustrating a first equipment 7021 according to another embodiment of the present invention. As shown in FIG. 7, the first equipment 7021 includes two sides. But the present invention is not limited to the first equipment 7021 only including two sides, that is, the first equipment 7021 can include at least two sides. Therefore, the first equipment 7021 can provide two first calibration patterns 702, 704, wherein the first calibration patterns 702, 704 are displayed on the two sides of the first equipment 7021 respectively. The first calibration pattern 702 is a chessboard pattern, and as shown in FIG. 8, the first calibration pattern 704 is a non-regular pattern, for example, a random pattern. In addition, in one embodiment of the present invention, the first calibration patterns 702, 704 can be implemented by paper, glass, wood, light, or projected image. Please refer to FIG. 7 again, since the first equipment 7021 is coupled to the first rotating shaft 703 making the first equipment 7021 is rotated via the first rotating shaft 703, the first calibration pattern 702 and the first calibration pattern 704 can both face to the image capturers IC11, IC12. After the image capturers IC11, IC12 capture first images including space information of a plurality of angles corresponding to the first calibration pattern 702 and the host 106 receives the first images including the space information of the plurality of angles and calibrates deformation of the first images including the space information of the plurality of angles according to the first calibration pattern 702 and the space information of the plurality of angles, the first equipment 7021 can again be rotated via the first rotating shaft 703 to make the first calibration pattern 704 face to the image capturers IC11, IC12. Meanwhile, the first equipment 7021 can be moved along the first slide rail 1061 to make the first equipment 7021 display the first calibration pattern 704 on different positions of the first slide rail 1061, so the image capturers IC11, IC12 can capture the first images including the first calibration pattern 704 on the different positions of the first slide rail 1061. The host 106 can receive the first images corresponding to the different positions, generate depth maps corresponding to the different positions according to the first images corresponding to the different positions, or calibrate the depth information (that is, a disparity-to-distance calibration or a distance-to-distance calibration) corresponding to the different positions according to a plurality of feature points of the first calibration pattern 704. In addition, in another embodiment of the present invention, the first equipment 7021 is a display to display the first calibration pattern 702 or the first calibration pattern 704, that is, the first equipment 7021 would not display the first calibration pattern 702 and the first calibration pattern 704 at the same time. When the first equipment 7021 displays the first calibration pattern 702, the first equipment 7021 can be rotated via the first rotating shaft 703. When the first equipment 7021 displays the first calibration pattern 704, the first equipment 7021 can be rotated via the first rotating shaft 703 or not, and the first equipment 7021 would optionally enlarge the first calibration pattern 704 with increase of a distance between the first equipment 7021 and the camera 101.

Figure 9:
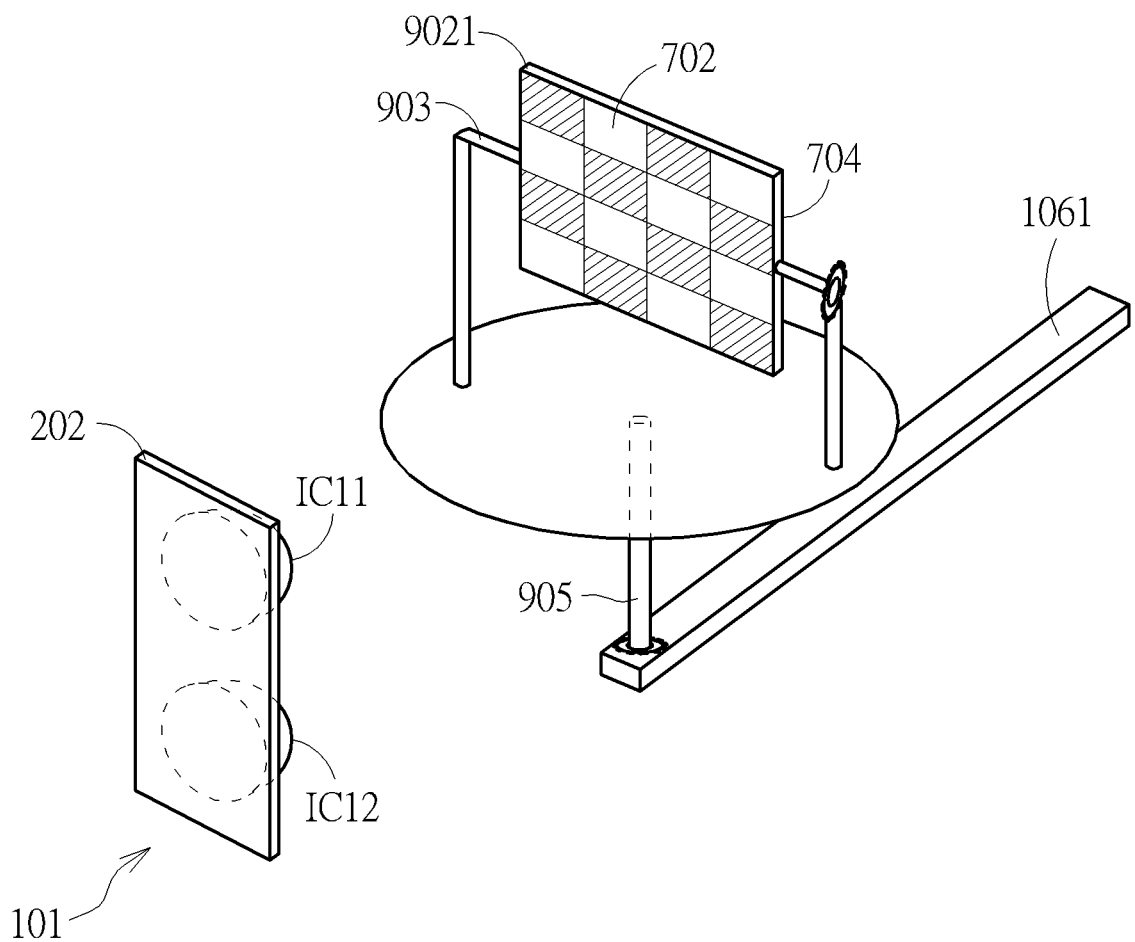
FIG. 9 is a diagram illustrating a first equipment according to another embodiment of the present invention.

In addition, please refer to FIG. 9. FIG. 9 is a diagram illustrating a first equipment 9021 according to another embodiment of the present invention. As shown in FIG. 9, a difference between the first equipment 9021 and the first equipment 7021 is that the first equipment 9021 can be rotated via a first rotating shaft 903 and via a second rotating shaft 905, wherein a direction of the first rotating shaft 903 is perpendicular to a direction of the second rotating shaft 905. But the present invention is not limited to the direction of the first rotating shaft 903 being perpendicular to the direction of the second rotating shaft 905, that is, the direction of the first rotating shaft 903 can be not perpendicular to the direction of the second rotating shaft 905. Also, the present invention is not limited to the first equipment 9021 only being rotated via the first rotating shaft 903 and via the second rotating shaft 905, that is, the first equipment 9021 can be rotated via a plurality of rotating shafts. As shown in FIG. 9, the first equipment 9021 can be rotated via the first rotating shaft 903 to make the first calibration pattern 702 or the first calibration pattern 704 face to the image capturers IC11, IC12. In addition, when the first equipment 9021 is rotated via the first rotating shaft 903, or is rotated via the second rotating shaft 905, or is rotated via the first rotating shaft 903 and the second rotating shaft 905, the image capturers IC11, IC12 can capture the first images including the space information of the plurality of angles corresponding to the first calibration pattern 702. In addition, subsequent operational principles of the first equipment 9021 can be referred to corresponding descriptions in FIG. 7, so further description thereof is omitted for simplicity.

Figure 10:
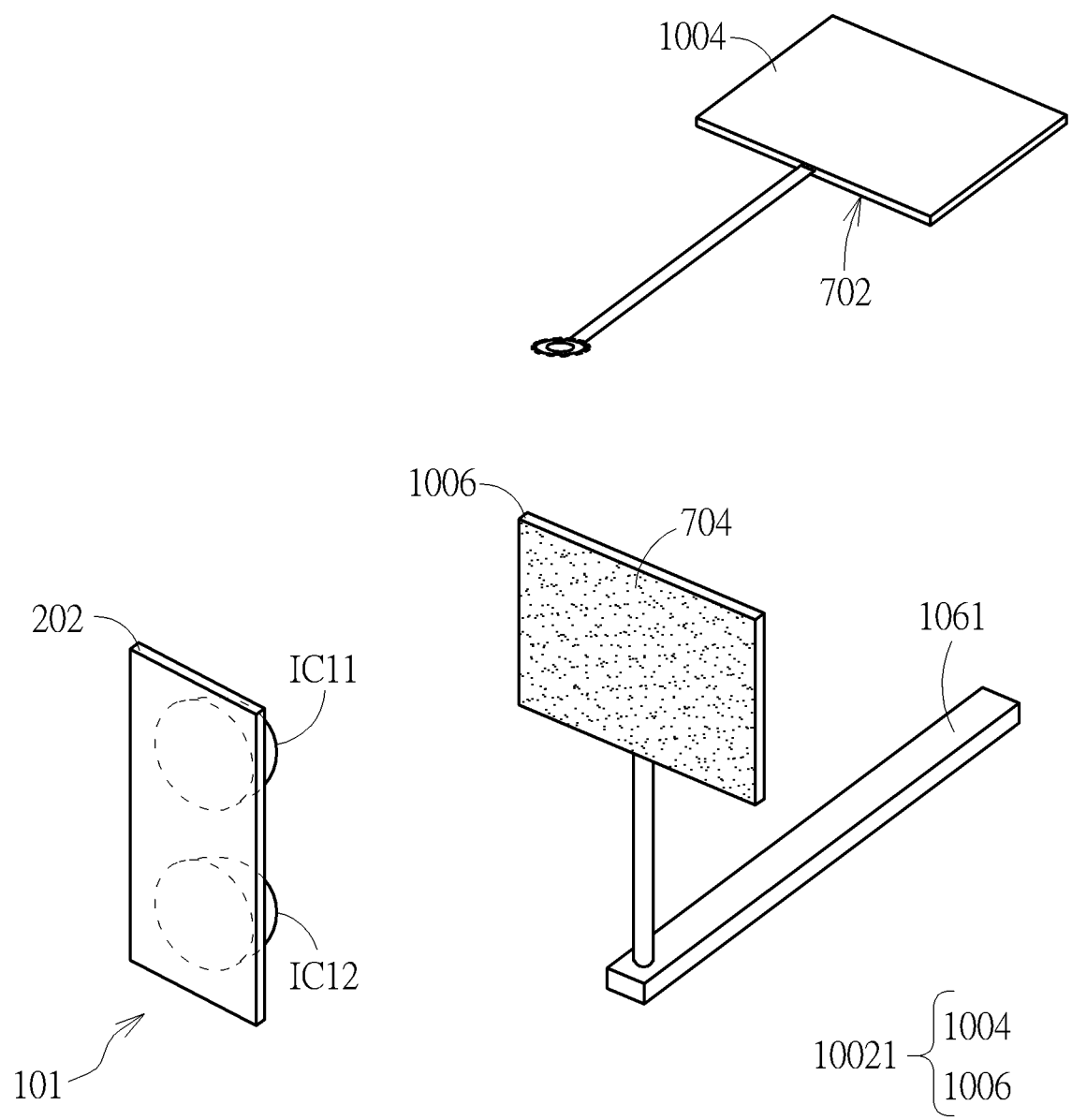
FIG. 10 is a diagram illustrating a first equipment according to another embodiment of the present invention.

Please refer to FIG. 10. FIG. 10 is a diagram illustrating a first equipment 10021 according to another embodiment of the present invention. As shown in FIG. 10, the first equipment 10021 includes a first rotating device 1004 and a moving device 1006, wherein the first calibration pattern 702 is displayed on the first rotating device 1004 and the first calibration pattern 704 is displayed on the first moving device 1006. As shown in FIG. 10, when the first rotating device 1004 faces to the image capturers IC11, IC12, the moving device 1006 is turned off (at this moment, the moving device 1006 lies on the first slide rail 1061, so the image capturers IC11, IC12 do not capture first images including the first calibration pattern 704), the image capturers IC11, IC12 can capture the first images including the first calibration pattern 702. Operational principles of the image capturers IC11, IC12 capturing the first images including the space information of the plurality of angles corresponding to the first calibration pattern 702 and the host 106 calibrating the first images including the space information of the plurality of angles can be referred to the corresponding descriptions in FIG. 7, so further description thereof is omitted for simplicity. In addition, after the host 106 calibrates the first images including the space information of the plurality of angles, the first rotating device 1004 is turned off (at this moment, the image capturers IC11, IC12 do not capture the first images including the first calibration pattern 702), the moving device 1006 is turned on (at this moment, the moving device 1006 stands on the first slide rail 1061). Meanwhile the image capturers IC11, IC12 can capture the first images including the first calibration pattern 704. Operational principles of the image capturers IC11, IC12 capturing the first images including the first calibration pattern 704 and the host 106 calibrating the first images including the first calibration pattern 704 can also be referred to the corresponding descriptions in FIG. 7, so further description thereof is omitted for simplicity.

Figure 11:
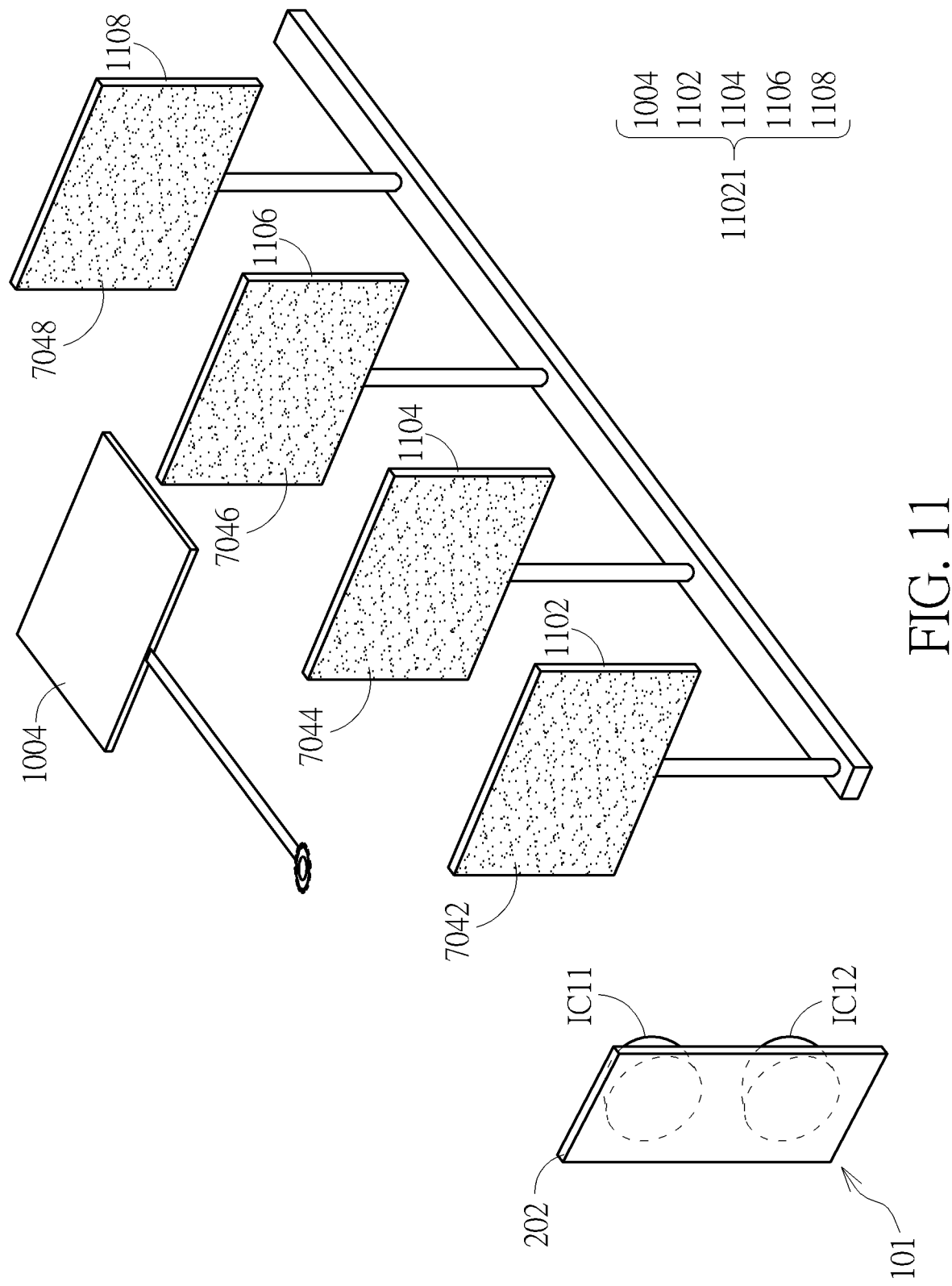
FIG. 11 is a diagram illustrating a first equipment according to another embodiment of the present invention.

Please refer to FIG. 11. FIG. 11 is a diagram illustrating a first equipment 11021 according to another embodiment of the present invention. A difference between the first equipment 11021 and the first equipment 10021 is that the first equipment 11021 includes four display devices 1102, 1104, 1106, 1108. But the present invention is not limited to the first equipment 11021 only including the four display devices 1102, 1104, 1106, 1108, that is, the first equipment 11021 can include a plurality of display devices. As shown in FIG. 11, four first calibration patterns 7042, 7044, 7046, 7048 are displayed on the four display devices 1102, 1104, 1106, 1108 respectively, that is, the first calibration pattern 7042 is displayed on the display device 1102, the first calibration pattern 7044 is displayed on the display device 1104, the first calibration pattern 7046 is displayed on the display device 1106, the first calibration pattern 7048 is displayed on the display device 1108, wherein the four first calibration patterns 7042, 7044, 7046, 7048 are non-regular patterns, for example, random patterns, wherein the non-regular patterns can be the same or not, for example, a pattern of the non-regular patterns that is farther away from the camera 101 can be optionally enlarged. In addition, since the four display devices 1102, 1104, 1106, 1108 of the first equipment 11021 are installed on different fixed positions respectively, functions of the four display devices 1102, 1104, 1106, 1108 of the first equipment 11021 can be utilized to substitute for a function of the first slide rail 1061. For example, as shown in FIG. 11, the image capturers IC11, IC12 can capture first images including the first calibration pattern 7042. When the display device 1102 is turned off, the image capturers IC11, IC12 can capture first images including the first calibration pattern 7044, and so on. In addition, subsequent operational principles of the first equipment 11021 can be referred to corresponding descriptions in FIG. 10, so further description thereof is omitted for simplicity.

Figure 12:
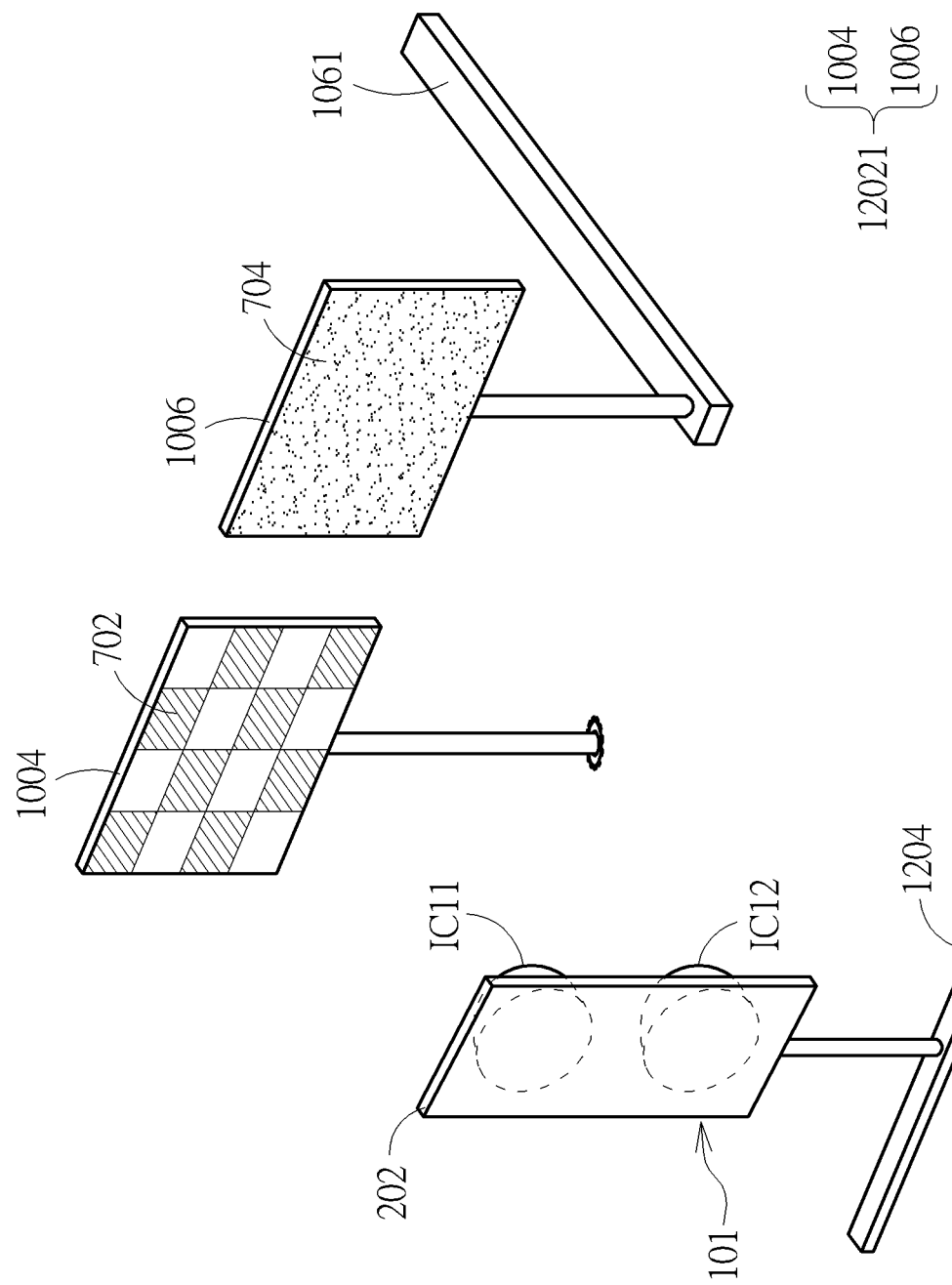
FIG. 12 is a diagram illustrating the system further including the second slide rail.

In addition, in another embodiment of the present invention, the system 100 further includes a second slide rail 1204 (as shown in FIG. 12), wherein installed positions of the first rotating device 1004 and the moving device 1006 including in a first equipment 12021 can be referred to FIG. 12. The first calibration pattern 702 is displayed on the first rotating device 1004 and the first calibration pattern 704 is displayed on the moving device 1006. As shown in FIG. 12, the camera 101 can be moved along the second slide rail 1204 to make the image capturing group ICG1 face to the first rotating device 1004 or the moving device 1006. Since the camera 101 can be moved along the second slide rail 1204, the image capturers IC11, IC12 can capture the first images including the space information of the plurality of angles corresponding to the first calibration pattern 702, or first images including the first calibration pattern 704. In addition, subsequent operational principles of the first equipment 12021 can be referred to the corresponding descriptions in FIG. 7, so further description thereof is omitted for simplicity.

Figure 13:
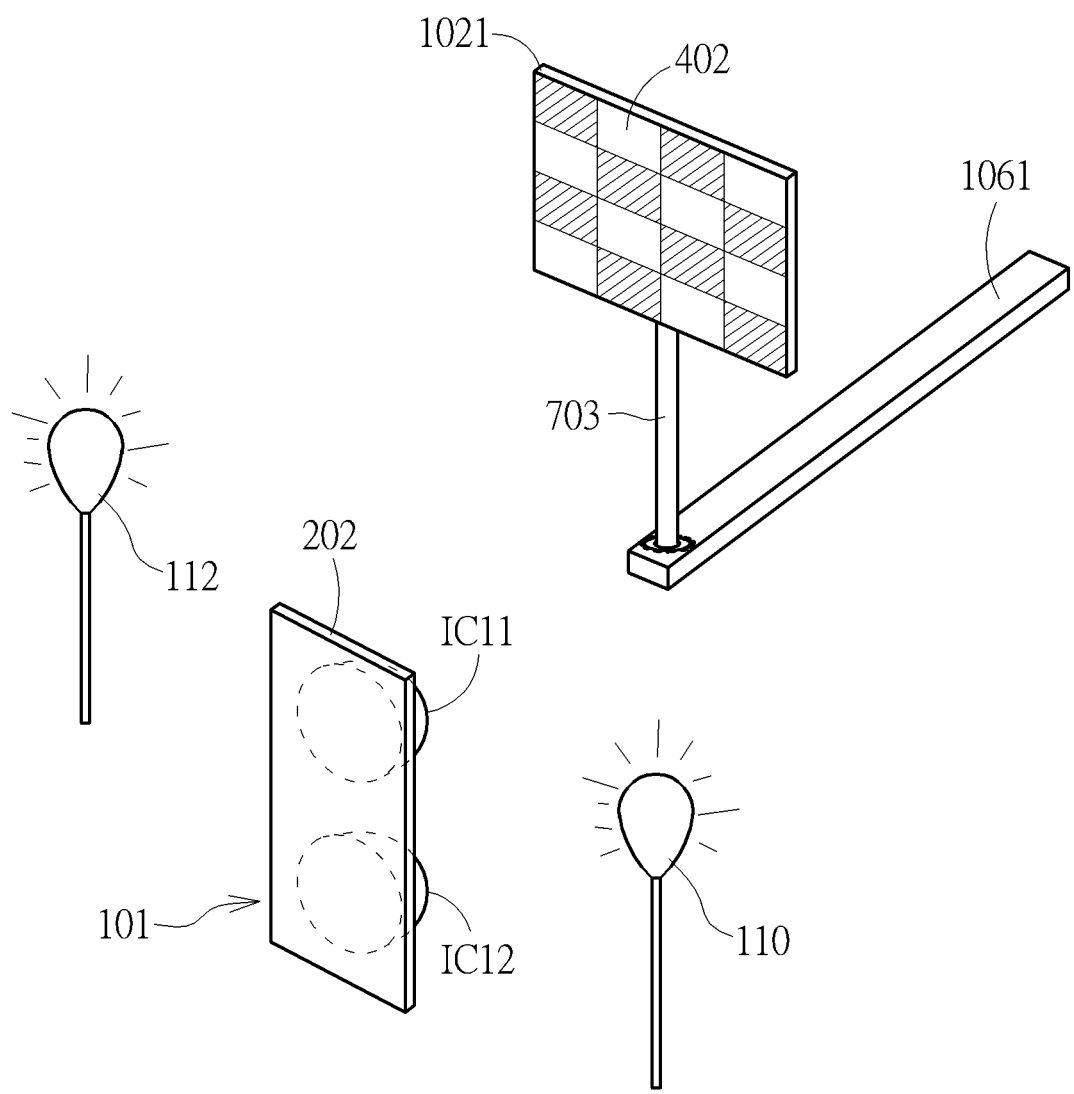
FIG. 13 is a diagram illustrating the system including a first light source and a second light source according to another embodiment of the present invention.

Please refer to FIG. 13. FIG. 13 is a diagram illustrating the system 100 including a first light source 110 and a second light source 112 according to another embodiment of the present invention, wherein the camera 101 of FIG. 13 only shows the image capturers IC11, IC12 for simplicity. As shown in FIG. 13, a difference between the embodiment in FIG. 13 and the embodiment in FIG. 4 is that the system 100 includes the first light source 110 and the second light source 112. The first light source 110 is used for generating structured light, and the second light source 112 is used for generating uniform light. As shown in FIG. 13, when the first light source 110 is turned off and the second light source 112 is turned on, the first equipment 1021 can be moved along the first slide rail 1061 or not. Meanwhile, the image capturers IC11, IC12 can capture the first images including the space information of the plurality of angles corresponding to the first calibration pattern 402. After the image capturers IC11, IC21 capture the first images including the space information of the plurality of angles, the host 106 can receive the first images including the space information of the plurality of angles and calibrate the deformation of the first images including the space information of the plurality of angles according to the first calibration pattern 402 and the space information of the plurality of angles. When the first light source 110 is turned on and the second light source 112 is turned off, the first equipment 1021 can be moved along the first slide rail 1061 to make the first equipment 1021 display the first calibration pattern 402 on the different positions of the first slide rail 1061. Meanwhile the image capturers IC11, IC12 can capture the first images including the first calibration pattern 402 and the structured light. After the image capturers IC11, IC12 capture the first images corresponding to the different positions, the host 106 can receive the first images corresponding to the different positions, generate depth maps corresponding to the different positions according to the first images corresponding to the different positions, or calibrate the depth information (that is, the disparity-to-distance calibration or the distance-to-distance calibration) corresponding to the different positions according to the plurality of feature points of the first calibration pattern 402. Moreover, the first light source 110 and the second light source 112 are infrared light sources. But, the present invention is not limited to the first light source 110 and the second light source 112 being the infrared light sources, that is, the first light source 110 and the second light source 112 can be other type of light sources (e.g. the first light source 110 and the second light source 112 can be visible light sources) or a projector. Moreover, the light source 110 can be an external independent light source or an internal component of the camera 101. And the present invention is not limited to the system 100 only including the first light source 110 and the second light source 112, that is, the system 100 can include a plurality of first light source and a plurality of second light source. Moreover, in another embodiment of the present invention, the first equipment 1021 of FIG. 4, FIG. 6, the first equipment 7021 of FIG. 7, the first rotating device 1004 of FIG. 10, FIG. 11, FIG. 12, and the first equipment 1021 of FIG. 13 can be rotated via the plurality of rotating shaft.

Figure 14:
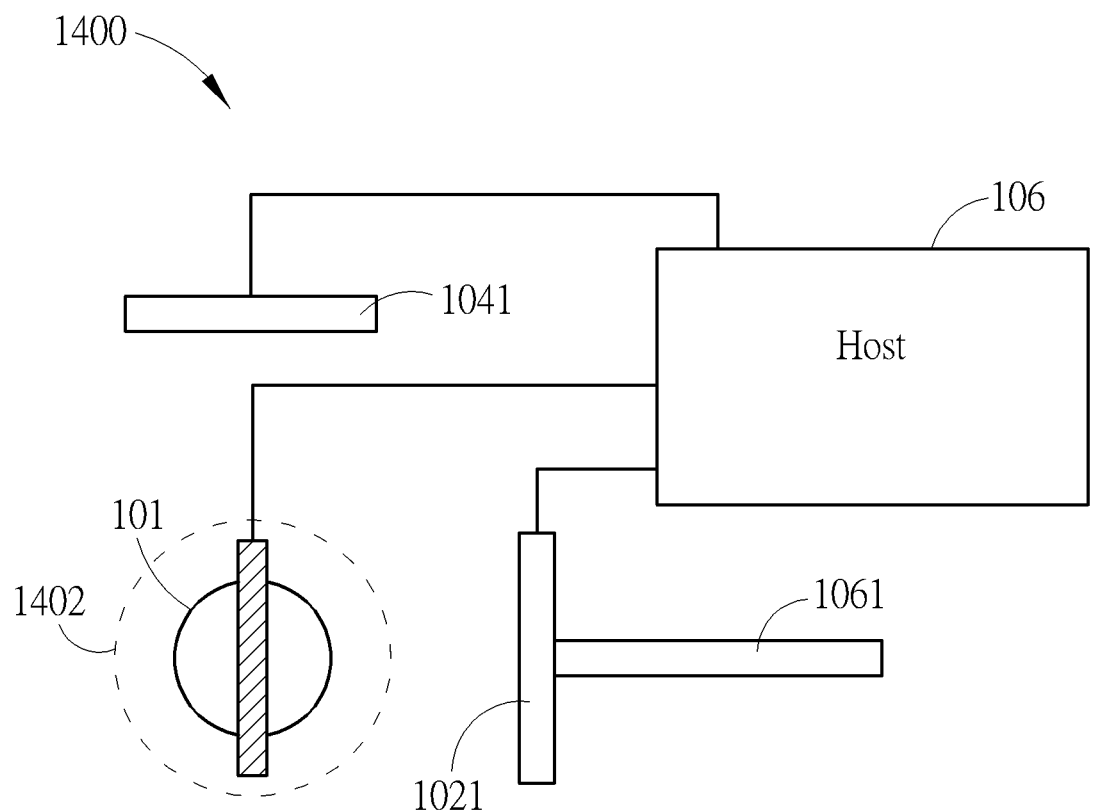
FIG. 14 is a diagram illustrating a system of calibrating camera according to a second embodiment of the present invention.

Please refer to FIG. 14. FIG. 14 is a diagram illustrating a system 1400 of calibrating camera according to a second embodiment of the present invention. As shown in FIG. 14, a difference between the system 1400 and the system 100 is that the system 1400 includes the first equipment 1021, the second equipment 1041 and a second rotating device 1402, wherein operational principles of the first equipment 1021 and the second equipment 1041 can be referred to the above mentioned descriptions, so further description thereof is omitted for simplicity. As shown in FIG. 14, the camera 101 is installed on the second rotating device 1402, so as the second rotating device 1402 rotates, the second rotating device 1402 can make the image capturing groups ICG1 or the image capturing groups ICG2 face to the first equipment 1021. Moreover, subsequent operational principles of the system 1400 are the same as those of the system 100, so further description thereof is omitted for simplicity.

Figure 15:
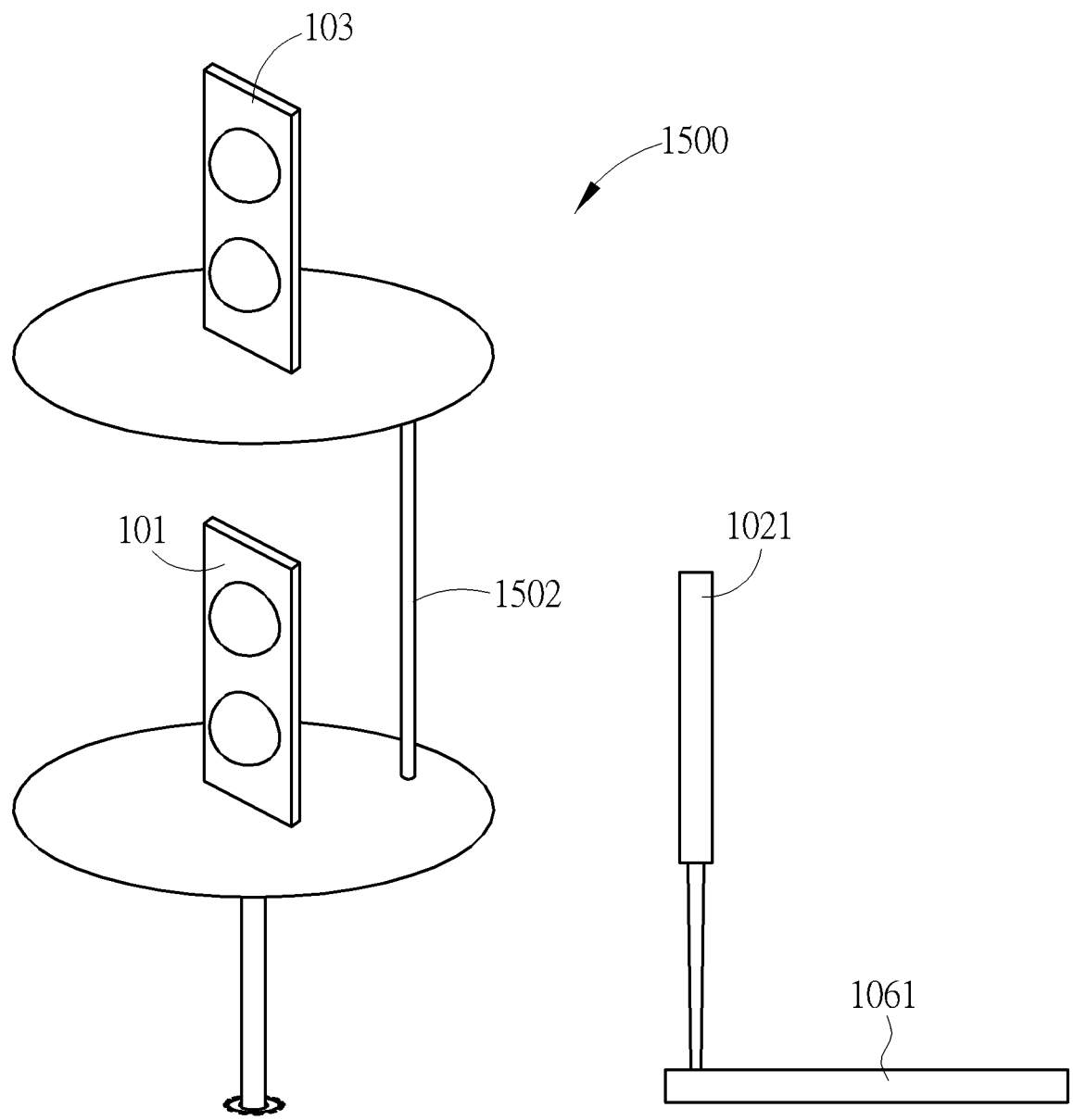
FIG. 15 is a diagram illustrating a system of calibrating camera according to a third embodiment of the present invention

In addition, please refer to refer to FIG. 15. FIG. 15 is a diagram illustrating a system 1500 of calibrating camera according to a third embodiment of the present invention (wherein FIG. 15 only shows the first equipment 1021, a platform device 1502 and two cameras 101, 103 for simplicity). As shown in FIG. 15, a difference between the system 1500 and the system 100 is that the system 1500 further includes the platform device 1502. Since the platform device 1502 includes two platforms, the system 1500 can calibrates the two cameras 101, 103 at the same time, and the cameras 101, 103 are placed on the two platforms respectively. Moreover, the present invention is not limited to the platform device 1502 only including the two platforms, that is, the platform. device 1502 can include a plurality of platforms. Further, the platform device 1502 can be rotated or not. In addition, operational principles of the system 1500 calibrating the two cameras 101, 103 can be referred to the above-mentioned descriptions, so further description thereof is omitted for simplicity.

Figure 16:
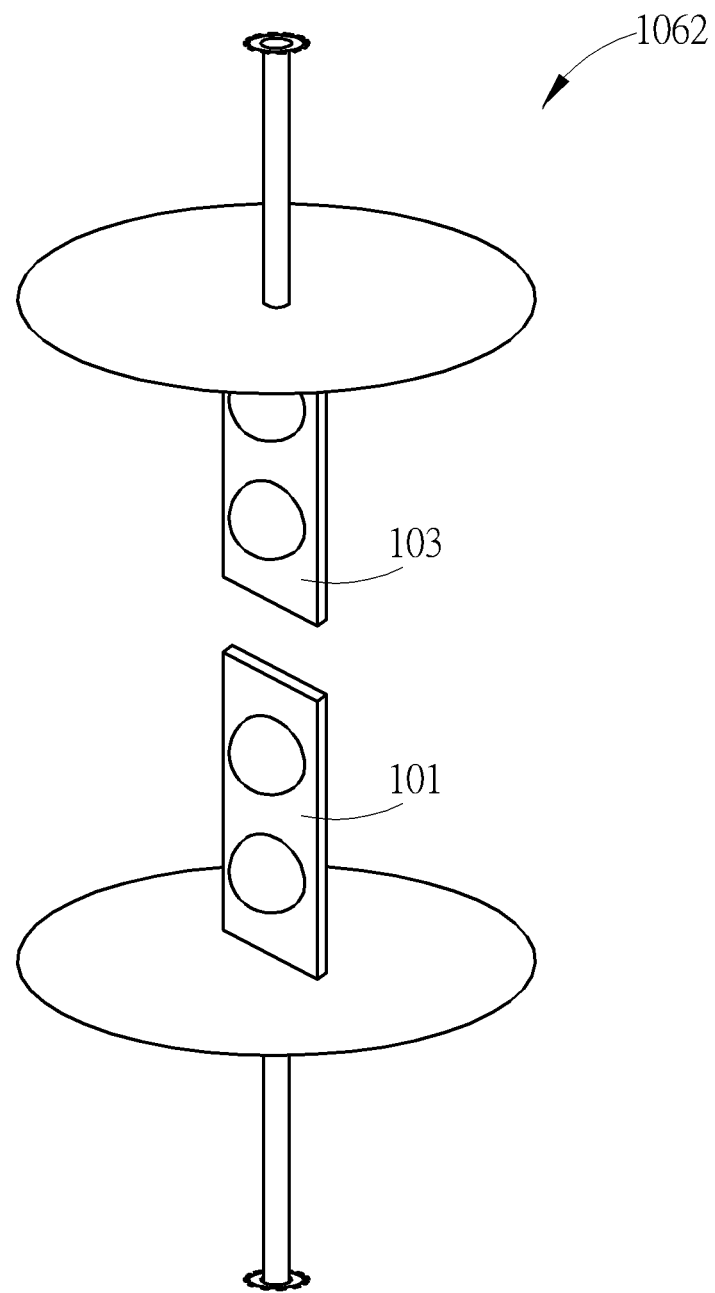
FIG. 16 is a diagram illustrating a platform device according to another embodiment of the present invention.

Please refer to refer to FIG. 16. FIG. 16 is a diagram illustrating a platform device 1602 according to another embodiment of the present invention. As shown in FIG. 16, a difference between the platform device 1602 and the platform device 1502 is that a platform of two platforms included in the platform device 1602 is installed above another platform of the two platforms, wherein the platform further includes a latch to make the camera 103 placed on the platform not to fall. In addition, the platform and the another platform can be rotated or not.

Figure 17:
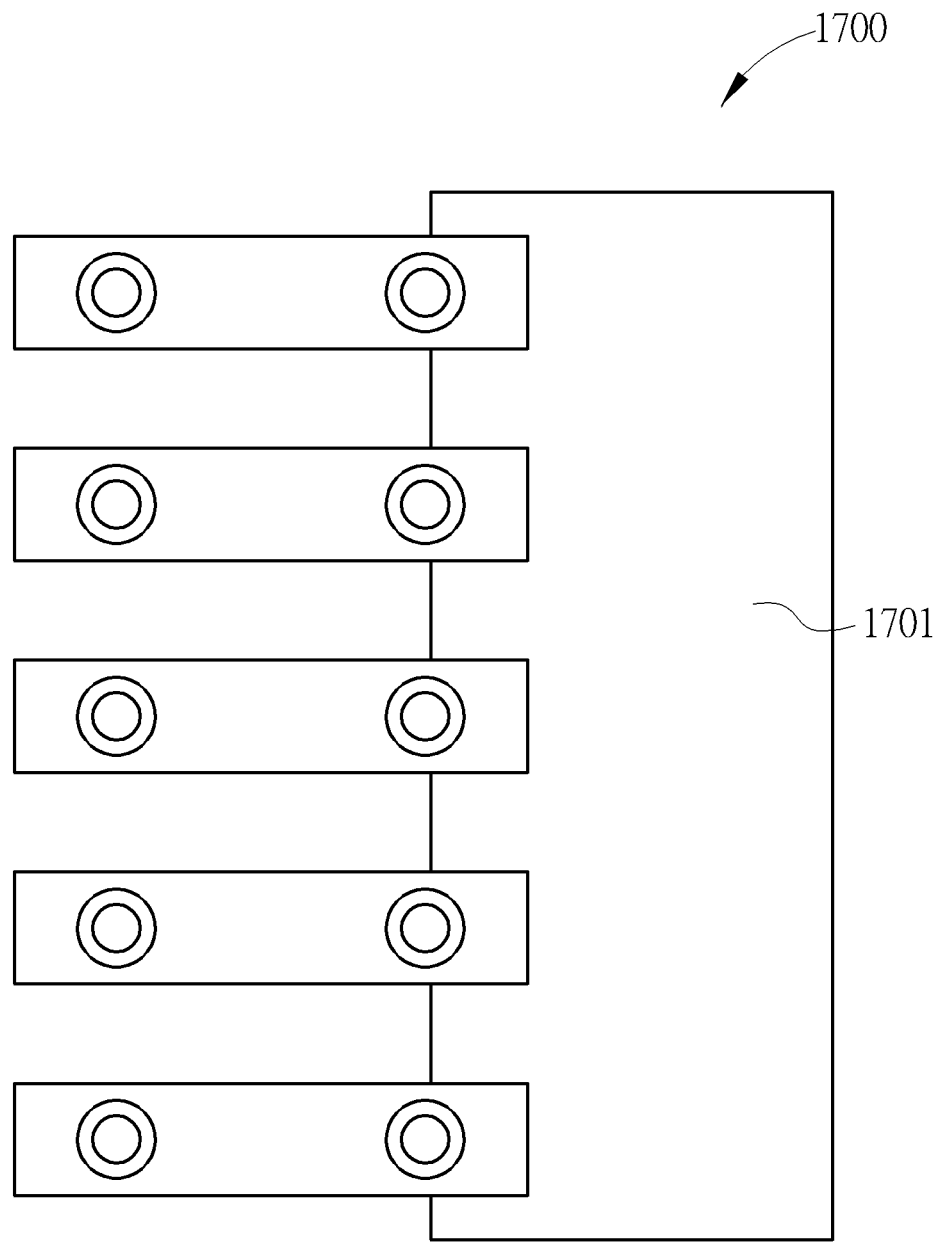
FIG. 17 is a diagram illustrating a system of calibrating camera according to a forth embodiment of the present invention.

In addition, please refer to FIG. 17. FIG. 17 is a diagram illustrating a system 1700 of calibrating camera according to a forth embodiment of the present invention (wherein FIG. 17 only shows a slot device 1701 for simplicity). As shown in FIG. 17, a difference between the system 1700 and the system 100 is that the system 1700 further includes the slot device 1701, wherein the slot device 1701 includes five slots, and the five slots are Universal Serial Bus (USB) slots. But, the present invention is not limited to the slot device 1701 including the five slots, and also not limited to the five slots being the USB slots, that is, the slot device 1701 can include a plurality of slots, and the five slots can be other type of slots. As shown in FIG. 17, since the slot device 1701 includes the five slots, the system 1700 can calibrate five cameras inserted into the five slots at the same time. In addition, operational principles of the system 1700 calibrating the five cameras can be referred to the above mentioned descriptions, so further description thereof is omitted for simplicity.

In addition, please refer to FIGS. 1, 3 again. The second equipment 1041 provides a second calibration pattern. But the present invention is not limited to the second equipment 1041 only providing the second calibration pattern, that is, the second equipment 1041 can provide a plurality of the second calibration pattern, wherein the second calibration pattern can be implemented by paper, glass, wood, light, or projected image. But in another embodiment of the present invention, the second calibration pattern is a display for displaying the first calibration pattern 402. As shown in FIG. 1, the second equipment 1041 is installed on a corresponding fixed position. But in another embodiment of the present invention, the second equipment 1041 is installed on a corresponding slide rail, and can be moved along the corresponding slide rail. As shown in FIG. 3, since the second equipment 1041 is installed inside the view angle FOV11 and the view angle FOV21, the two corresponding adjacent image capturers (that is, the image capturers IC11, IC21) of the image capturing groups ICG1, ICG2 can capture second image including the second calibration pattern. Since the second image can be stitched to generate a 360 panoramic image corresponding to the two corresponding adjacent image capturers, after the host 106 receives the second image, the host 106 can calibrate seams between the second images according to the second calibration pattern. In addition, subsequent operational principles of the second equipment 1042 are the same as those of the second equipment 1041, so further description thereof is omitted for simplicity.

To sum up, the system provided by the present invention utilizes each first equipment to provide at least one first calibration pattern and utilizes each second equipment to provide the at least one second calibration pattern, wherein the at least one first calibration pattern is utilized to calibrate first images including the at least one first calibration pattern, wherein the first images are captured by a plurality of corresponding image capturers of the camera, and the at least one second calibration pattern is utilized to calibrate second images including the at least one second calibration pattern, wherein the second images are captured by two corresponding adjacent image capturers of the camera. Therefore, compared to the prior art, the present invention can reduce time and space requirements of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera calibration system, wherein a camera comprises at least two image capturers, the camera calibration system comprising:
   at least one light source generating at least one structured light; and
   a first equipment, wherein the first equipment provides at least one first calibration pattern, the first equipment is configured to rotate via a first rotating shaft to make the at least one first calibration pattern rotated with the first equipment, and the at least one first calibration pattern is utilized to calibrate first images captured by the at least two image capturers of the camera, wherein the first images have space information of a plurality of angles corresponding to rotation of the at least one first calibration pattern;
   wherein when the at least one first calibration pattern is utilized to calibrate deformation of the first images, the at least one light source is turned off, and when the at least one first calibration pattern is utilized to calibrate depth maps corresponding to the first images, the at least one light source is turned on.

2. The camera calibration system of claim 1, further comprising:
   a host, coupled to the first equipment and the camera, wherein the host receives the first images, and calibrates deformation of the first images and depth maps corresponding to the first images according to the at least one first calibration pattern.

3. The camera calibration system of claim 1, wherein the first equipment is installed inside view angles of corresponding image capturers.

4. The camera calibration system of claim 1, further comprising:
   a first slide rail, wherein the first equipment is moved along the first slide rail to make the first equipment display the at least one first calibration pattern on different positions of the first slide rail.

5. The camera calibration system of claim 1, wherein the first equipment provides two first calibration patterns, a first calibration pattern of the two first calibration patterns is utilized to calibrate deformation of the first images, and another first calibration pattern of the two first calibration patterns is utilized to calibrate depth maps corresponding to the first images.

6. The camera calibration system of claim 5, wherein the first equipment comprises at least two sides, the first calibration pattern and the another first calibration pattern are displayed on two different sides of the at least two sides respectively.

7. The camera calibration system of claim 5, wherein the first equipment is further rotated via a second rotating shaft.

8. The camera calibration system of claim 5, wherein the first equipment comprises:
   a moving device, wherein the another first calibration pattern is displayed on the moving device, and the moving device is moved along a first slide rail further comprised in the camera calibration system; and
   a first rotating device, wherein the first calibration pattern is displayed on the first rotating device, and the first rotating device is rotated via the first rotating shaft.

9. The camera calibration system of claim 1, wherein the first equipment provides a plurality of first calibration patterns, a first calibration pattern of the plurality of first calibration patterns is utilized to calibrate deformation of the first images, and other first calibration patterns of the plurality of first calibration patterns are utilized to calibrate depth maps corresponding to the first images.

10. The camera calibration system of claim 9, wherein the first equipment comprises:
    a plurality of display devices, installed on different fixed positions respectively, wherein the other first calibration patterns are displayed on the plurality of display devices respectively; and
    a first rotating device, wherein the first calibration pattern is displayed on the first rotating device, and the first rotating device is rotated via the first rotating shaft.

11. The camera calibration system of claim 1, further comprising:
    a first slide rail, wherein the camera is moved along the first slide rail.

12. The camera calibration system of claim 1, further comprising:
    a first rotating device rotating the camera.

13. The camera calibration system of claim 1, further comprising:

a platform device, wherein the at least one camera is placed on the platform device.

14. The camera calibration system of claim 1, further comprising:
a slot device, wherein the at least one camera is inserted into the slot device.

15. A camera calibration system, wherein a camera comprises at least two image capturers, the camera calibration system comprising:
at least two light sources, wherein at least one first light source of the at least two light sources generates at least one structured light and at least one second light source of the at least two light sources generates at least one uniform light;
a first equipment, wherein the first equipment provides at least one first calibration pattern, the first equipment is configured to move along at least one slide rail and is configured to rotate via a first rotating shaft to make the at least one first calibration pattern rotated with the first equipment, and the one first calibration pattern is utilized to calibrate first images captured by the at least two image capturers of the camera, wherein the first images have space information of a plurality of angles corresponding to rotation of the at least one first calibration pattern, wherein when the first calibration pattern is utilized to calibrate deformation of the first images, the at least one second light source is turned on and the at least one first light source is turned off, and when the first calibration pattern is utilized to calibrate depth maps corresponding to the first images, the at least one second light source is turned off and the at least one first light source is turned on; and
a rotating device rotating the camera.

16. The camera calibration system of claim 15, wherein the first images further have space information of different positions corresponding to motion of the at least one first calibration pattern.

17. A camera calibration system, wherein a camera comprises at least two image capturers, the system comprising:
a light source, wherein the light source generates structured light; and
a first equipment, wherein the first equipment provides a first calibration pattern, the first equipment is configured to move along at least one slide rail and configured to rotate via a first rotating shaft, when the first calibration pattern is utilized to calibrate deformation of first images captured by the at least two image capturers of the camera, the light source is turned off, and when the first calibration pattern is utilized to calibrate depth maps corresponding to the first images, the at least one light source is turned on, wherein the first images correspond to the first calibration pattern.

* * * * *